US012190684B2

(12) United States Patent
Heathcote et al.

(10) Patent No.: US 12,190,684 B2
(45) **Date of Patent: *Jan. 7, 2025**

(54) LOTTERY GAMING SYSTEM, TICKET, AND METHOD

(71) Applicant: IGT GLOBAL SOLUTIONS CORPORATION, Providence, RI (US)

(72) Inventors: Bradford Heathcote, Cumberland, RI (US); Aaron Michael Koll, Lincoln, CA (US); Sarah Simpkins, Warwick, RI (US)

(73) Assignee: IGT Global Solutions Corporation, Providence, RI (US)

( * ) Notice: Subject to any disclaimer, the term of this patent is extended or adjusted under 35 U.S.C. 154(b) by 58 days.

This patent is subject to a terminal disclaimer.

(21) Appl. No.: 18/168,023

(22) Filed: Feb. 13, 2023

(65) Prior Publication Data

US 2023/0196886 A1 Jun. 22, 2023

Related U.S. Application Data

(63) Continuation of application No. 17/148,917, filed on Jan. 14, 2021, now Pat. No. 11,587,405, which is a continuation of application No. 16/429,725, filed on Jun. 3, 2019, now Pat. No. 10,896,582.

(51) Int. Cl.
*G07F 17/32* (2006.01)

(52) U.S. Cl.
CPC ........ *G07F 17/329* (2013.01); *G07F 17/3244* (2013.01); *G07F 17/326* (2013.01)

(58) Field of Classification Search
CPC ..... G07F 17/329; G07F 17/3244; G07F 17/32
See application file for complete search history.

(56) References Cited

U.S. PATENT DOCUMENTS

| | | | | |
|---|---|---|---|---|
| 6,702,668 | B2 | 3/2004 | Banyai | |
| 7,490,830 | B2 | 2/2009 | Mirandette et al. | |
| 7,510,116 | B2 | 3/2009 | Robb et al. | |
| 8,491,372 | B2 | 7/2013 | Walker et al. | |
| 8,747,209 | B2 | 6/2014 | Badrieh | |
| 9,251,663 | B1 | 2/2016 | Sandvick | |
| 10,445,981 | B2 | 10/2019 | Jones | |
| 2003/0045340 | A1 | 3/2003 | Roberts | |
| 2005/0003884 | A1 | 1/2005 | Meyer et al. | |
| 2006/0014578 | A1 | 1/2006 | Lovell | |
| 2010/0105462 | A1 * | 4/2010 | Walker | G07F 17/329 463/43 |
| 2010/0113124 | A1 | 5/2010 | Amirsadri et al. | |
| 2010/0203942 | A1 * | 8/2010 | Walker | G07F 17/329 463/43 |
| 2012/0165088 | A1 * | 6/2012 | Martinez-Ortega | G07F 17/329 463/17 |
| 2016/0148465 | A1 | 5/2016 | Arnone et al. | |
| 2016/0307405 | A1 | 10/2016 | Koll et al. | |
| 2019/0066450 | A1 | 2/2019 | Saccoccio et al. | |
| 2021/0043030 | A1 | 2/2021 | Nelson et al. | |
| 2021/0166519 | A1 | 6/2021 | Heathcote et al. | |

* cited by examiner

*Primary Examiner* — Ronald Laneau
(74) *Attorney, Agent, or Firm* — Neal, Gerber & Eisenberg LLP

(57) ABSTRACT

A lottery gaming system and method providing a lottery ticket with a pre-draw cash-in amount based on the player symbols of the lottery ticket.

20 Claims, 4 Drawing Sheets

FIG. 2

| # Of Matches On Ticket (210) | Odds 1 in (230) | Cash-In-Now Prize (250) | Evening Draw Prize (270) |
|---|---|---|---|
| 8 of the same number | 1 in 5,764,801 | $50,000 | $500,000 |
| 7 of the same number | 1 in 120,100 | $500 | $5,000 |
| 6 of the same number | 1 in 5,719 | $100 | $1,000 |
| 5 of the same number | 1 in 477 | $10 | $100 |
| 4 of the same number | 1 in 64 | $4 | $25 |
| 3 of the same number | 1 in 13 | Free Ticket | $5 |
| Overall Odds | 1 in 11 | | |

200

LOTTERY GAMING SYSTEM, TICKET, AND METHOD

PRIORITY

This patent application is a continuation of, claims priority to and the benefit of U.S. patent application Ser. No. 17/148,917, filed on Jan. 14, 2021, which is a continuation of, claims priority to and the benefit of U.S. patent application Ser. No. 16/429,725, filed on Jun. 3, 2019, now U.S. Pat. No. 10,896,582, issued on Jan. 19, 2021, the entire contents of each are incorporated by reference herein.

BACKGROUND

The present disclosure relates to lottery gaming systems, tickets, and methods, and more particularly to lottery gaming systems, tickets, and methods that enable the play of lottery games. Certain lottery gaming systems may enable a player to select one or more numbers for a lottery ticket, randomly select winning draw numbers, and if the winning draw numbers match the player-selected numbers, provide the player an award.

BRIEF SUMMARY

In various embodiments, the present disclosure relates to a lottery gaming system including a processor and a memory device that stores a plurality of instructions, that when executed by the processor, cause the processor to: responsive to receipt of a lottery ticket wager for a play of a lottery game, randomly select a first quantity of symbols from a plurality of different symbols to determine a player set of symbols for the play of the lottery game, the first quantity being more than one, wherein each of the different symbols can be randomly selected more than once to form the player set of symbols; determine any cash-in amount based on the player set of symbols and a paytable for the play of the lottery game; create a lottery ticket including an indication of the player set of symbols and an indication of any determined cash-in amount; store data associated with the lottery ticket; and cause the lottery ticket to be provided to the player. The plurality of instructions, when executed by the processor, further cause the processor to: before a draw for the play of the lottery game, responsive to receipt of a cash-in request for the lottery ticket, cause the determined cash-in amount for the lottery ticket to be provided to the player; at a designated draw time for the play of the lottery game, randomly select a winning draw symbol for the play of the lottery game; and responsive to receipt of the lottery ticket for redemption and responsive to the determined cash-in amount for the lottery ticket not being provided to the player, determine any award associated with the lottery ticket, the determination based on how many symbols of the player set of symbols match the draw symbol.

In various other embodiments, the present disclosure relates to a lottery ticket including a substrate; a selected symbols portion including an indication of a randomly selected first quantity of symbols from a plurality of different symbols that form a player set of symbols for a play of the lottery game, the first quantity being more than one, wherein each of the different symbols can be randomly selected more than once to form the player set of symbols for the lottery ticket; and a cash-in amount portion including an indication of a cash-in amount based on the player set of symbols, wherein the lottery ticket can be cashed-in for the cash-in amount before any draw for the lottery ticket, the cash-in amount based on the randomly selected player set of symbols and a paytable for the play of lottery game; and a ticket identification portion including an indication of an identification of the lottery ticket.

In various other embodiments, the present disclosure relates to a method of operating a gaming system, the method including responsive to receipt of a lottery ticket wager, via an input device, for a play of a lottery game, randomly selecting, via a processor, a first quantity of symbols from a plurality of different symbols to determine a player set of symbols for the play of the lottery game, the first quantity being more than one, wherein each of the different symbols can be randomly selected more than once to form the player set of symbols; determining, via the processor, any cash-in amount based on the player set of symbols and a paytable for the play of the lottery game; creating the lottery ticket, wherein the lottery ticket includes an indication of the player set of symbols and an indication of any determined cash-in amount for the lottery ticket; storing data associated with the lottery ticket; and causing the lottery ticket to be provided to the player. The method further includes before a draw for the play of the lottery game, responsive to receipt of a cash-in request for the lottery ticket, causing the determined cash-in amount for the lottery ticket to be provided to the player; at a designated draw time for the play of the lottery game, randomly selecting, via the processor, a winning draw symbol for the play of the lottery game; and responsive to receipt of the lottery ticket for redemption and responsive to the determined cash-in amount for the lottery ticket not being provided to the player, determining, via the processor, any award associated with the lottery ticket, the determination based on how many symbols of the player set of symbols match the draw symbol.

Additional features are described in, and will be apparent from, the following Detailed Description and the figures.

BRIEF DESCRIPTION OF THE SEVERAL VIEWS OF THE DRAWINGS

FIG. 2 is an example predetermined paytable of one example embodiment of the lottery gaming system of present disclosure.

DETAILED DESCRIPTION

In various embodiments, the present disclosure relates generally to a lottery gaming system, a lottery ticket, and a method of operating a lottery gaming system that provides a cash-in feature for the lottery ticket. In various embodiments, the lottery gaming system and method of operating the lottery gaming system enables a player to purchase a lottery ticket, and after being provided the randomly drawn player symbols (such as numbers) of the lottery ticket, depending on the randomly drawn player symbols, cash-in the lottery ticket prior to the draw for that lottery ticket, or await the draw for that lottery ticket.

Figure 1:
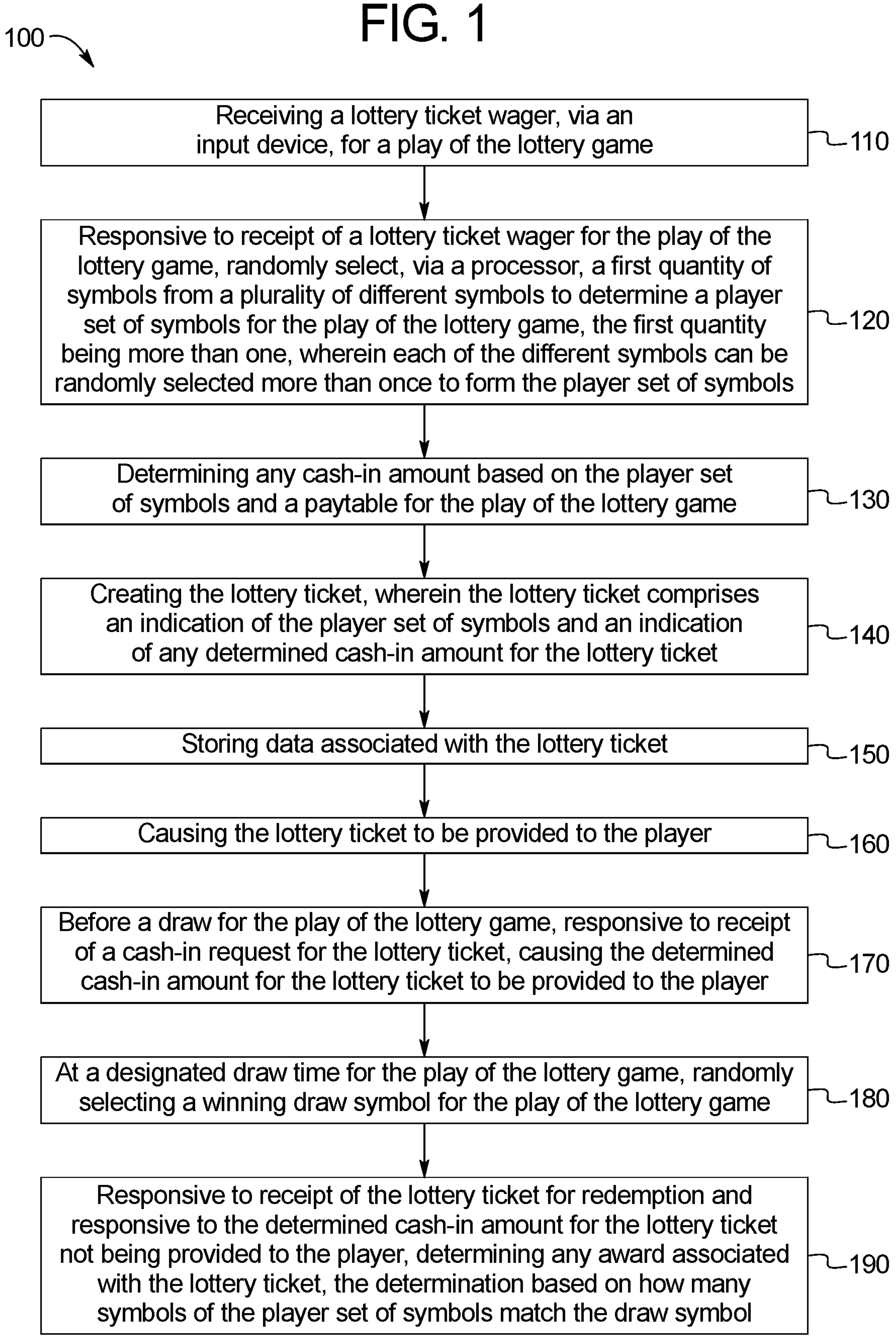
FIG. 1 is a flow chart of an example method for operating a lottery gaming system of one embodiment of the present disclosure.

FIG. 1 is a flowchart of an example method (indicated by numeral 100) of operating a lottery gaming system, a lottery ticket, of the present disclosure. In various embodiments, the method is represented by a set of instructions stored in one or more memory devices and executed by one or more processors. Although the method is described with reference to the flowchart shown in FIG. 1, many other processes of performing the acts associated with this illustrated example method may be employed. For example, the order of certain of the illustrated blocks may be changed, certain of the illustrated blocks may be optional, or certain of the illustrated blocks may not be employed.

In the example embodiment illustrated in FIG. 1, the method 100 includes the lottery gaming system: (1) receiving a lottery ticket wager, via an input device, for a play of the lottery game, as indicated by block 110; (2) responsive to receipt of a lottery ticket wager for the play of the lottery game, randomly selecting via a processor (of the lottery gaming system), a first quantity of symbols from a plurality of different symbols to determine a player set of symbols for the play of the lottery game, the first quantity being more than one, wherein each of the different symbols can be randomly selected more than once to form the player set of symbols, as indicated by block 120; and (3) determining, via the processor any cash-in amount based on the player set of symbols and a paytable for the play of the lottery game, as indicated by block 130. In this example embodiment, any of the individual symbols can be randomly selected any quantity of times up to the first quantity of symbols as further explained below.

The method 100 further includes: (4) creating the lottery ticket, wherein the lottery ticket includes an indication of the player set of symbols and an indication of any determined cash-in amount for the lottery ticket, as indicated by block 140; (5) storing data associated with the lottery ticket, as indicated by block 150; and (6) causing the lottery ticket to be provided to the player, as indicated by block 160. The lottery ticket can be a physical lottery ticket or a virtual lottery ticket. The cash-in amount is clearly displayed on the lottery ticket so that the player can understand exactly the amount of the offered cash-in.

The method 100 further includes: (7) before a draw for the play of the lottery game, responsive to receipt of a cash-in request for the lottery ticket (from the player), causing the determined cash-in amount for the lottery ticket to be provided to the player, as indicated by block 170. If the player cashes in the lottery ticket for the cash-in amount, the lottery ticket becomes redeemed (and invalid) for subsequent redemption based on the drawn symbol.

The method 100 further includes: (8) at a designated draw time for the play of the lottery game, randomly selecting, via the processor, a winning draw symbol for the play of the lottery game, as indicated by block 180. In this example embodiment, only a single drawn number is selected.

The method 100 further includes: (9) responsive to receipt of the lottery ticket for redemption and responsive to the determined cash-in amount for the lottery ticket not being provided to the player, determining any award associated with the lottery ticket, the determination based on how many symbols of the player set of symbols match the draw symbol, as indicated by block 190. The lottery gaming system causes the determined award to be provided to the player.

In a further example embodiment, the lottery game includes: (1) seven symbols, the symbols are numbers, the numbers are 1, 2, 3, 4, 5, 6, and 7, and the first quantity is eight.

In this example, the method of operating the lottery gaming system includes: (1) receiving a lottery ticket wager, via an input device, for a play of the lottery game, (2) responsive to receipt of a lottery ticket wager for the play of the lottery game, randomly select, via a processor, eight numbers from the plurality of numbers 1, 2, 3, 4, 5, 6, and 7 to determine a player set of symbols for the play of the lottery game, wherein each of the different numbers can be randomly selected more than once to form the player set of symbols.

For example, any of the following example player sets of numbers can be selected; (1) 1, 1, 1, 1, 1, 1, 1, 1; (2) 5, 5, 5, 5, 4, 4, 4, 4; (3) 3, 3, 3, 3, 3, 3, 4, 7; and (4) 2, 2, 3, 4, 5, 6, 6, 7. The first above example player set of numbers shows that any number can be selected eight times, which is the first quantity in this example. In this first example, no other numbers are selected. The second above example player set of numbers shows that multiple different numbers can each be selected multiple times to reach the first quantity of numbers (i.e., eight in this example). The third above example player set of number shows that one number can be selected multiple times and each multiple other numbers can each be selected once to reach the first quantity of numbers (i.e., eight in this example). The fourth above example player set of numbers show that multiple numbers can be selected multiple times and multiple numbers can be selected once to reach the first quantity of numbers (i.e., eight in this example).

This further example method further includes (3) determining any cash-in amount based on the player set of symbols and a paytable for the play of the lottery game; (4) creating the lottery ticket, wherein the lottery ticket includes an indication of the player set of numbers and an indication of any determined cash-in amount for the lottery ticket; (5) storing data associated with the lottery ticket; and (6) causing the lottery ticket to be provided to the player; (7) before a draw for the play of the lottery game, responsive to receipt of a cash-in request for the lottery ticket, causing the determined cash-in amount for the lottery ticket to be provided to the player; (8) at a designated draw time for the play of the lottery game, randomly selecting a winning draw number for the play of the lottery game; and (9) responsive to receipt of the lottery ticket for redemption and responsive to the determined cash-in amount for the lottery ticket not being provided to the player, determining any award associated with the lottery ticket, the determination based on how many numbers of the player set of numbers match the draw number.

In various embodiments, the higher the quantity of the player numbers that match each other, the higher the cash-in amount, because the higher the potential award can be provided if the drawn number matches the player numbers. cash-in amount can be.

FIG. 2 illustrates an example predetermined paytable 200 of one example embodiment. In this example embodiment, the predetermined paytable 200 includes: (1) a plurality of different quantities (#) of matches that can occur on a lottery ticket that are associated with an award as indicated by column 210; (2) the odds of each such quantity of matches occurring as indicated by column 230; (3) the amount of each of the different cash-in prizes or awards for each such quantity of matches as indicated in column 250; and (4) the amount of each of the different awards for each such quantity of matches based on the draw (instead of the cash-in amount) as indicated in column 270. It should be appreciated that the player will receive either the cash-in amount, or the draw prize amount, but not both in these example embodiments.

In this example embodiment, each of the odds in column 230 are different. In this example embodiment, each of the cash-in amounts in column 250 are different. In this example embodiment, each of the awards in column 270 are different. In this example embodiment, each of these amounts (in columns 250 and 270) is based on the respective odds in column 230. It should be appreciated that the quantity of symbols (e.g., numbers), the quantity of matches, the odds, and/or the amounts may vary in accordance with the present disclosure.

In this example embodiment, the lottery gaming system makes separate random determinations for each of the numbers of the player numbers in accordance with the odds of selecting such numbers. In other words, for each player number for the lottery ticket, the lottery gaming system independently randomly selects one of the seven different numbers to associate with that player symbol set. Thus, the random selection is in accordance with predetermined odds of randomly selecting each of that plurality of different numbers. In various embodiments in including this example, the odds for each selection are equal (i.e., one in seven) for each of the eight random selections for the player set of numbers.

In this example embodiment, the lottery gaming system makes a single random determination of a single number for the draw number. Specifically, the lottery gaming system independently randomly selects one of the seven different numbers to be the drawn number to compare to the player symbol set. In various embodiments in including this example, the odds for selecting any of the numbers as the draw number is one in seven.

Figure 3:
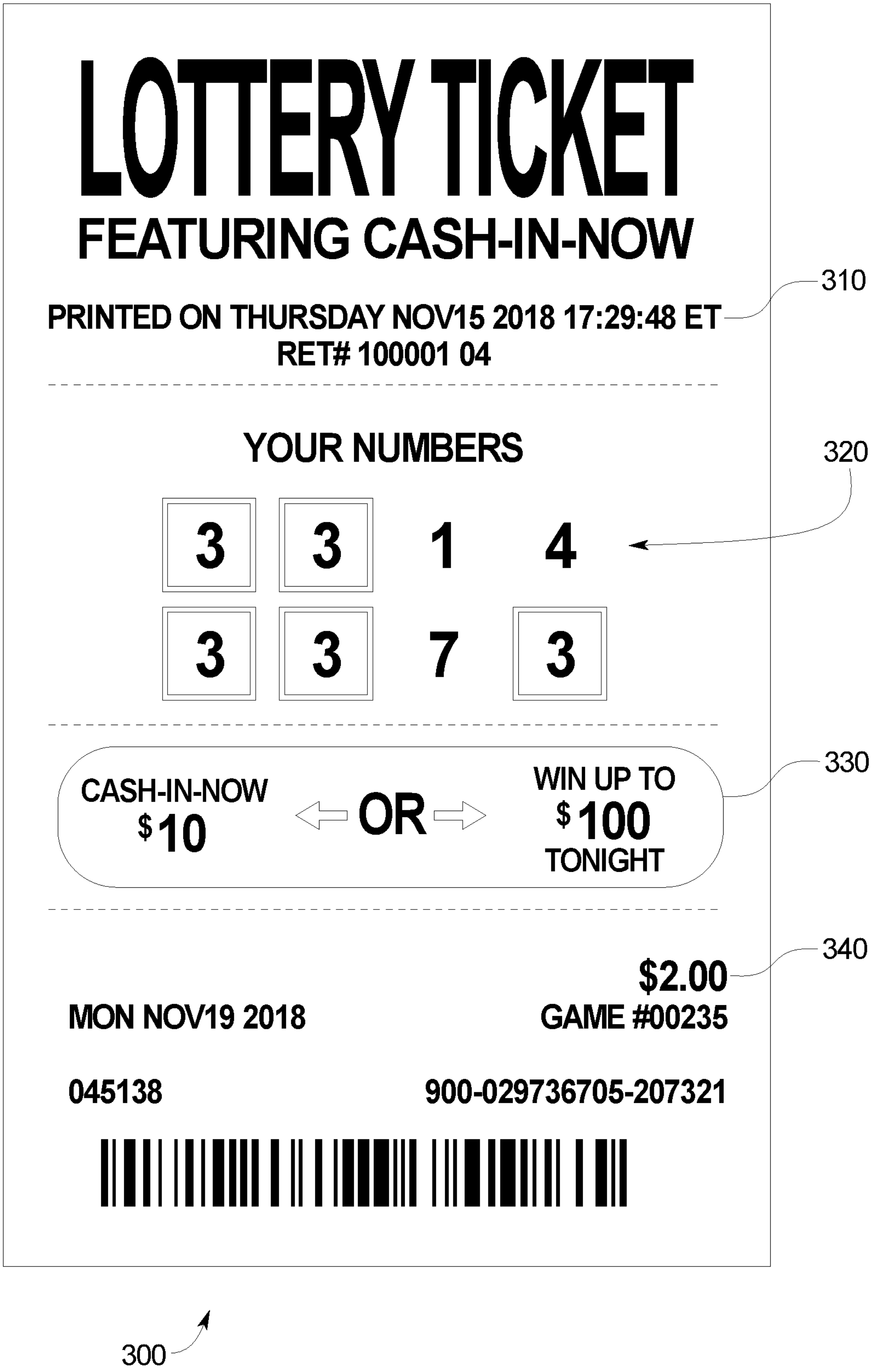
FIG. 3 is a front view of an example lottery ticket provided by one example embodiment of the lottery gaming system of present disclosure.

FIG. 3 shows an example lottery ticket 300 created by the lottery gaming system of this example embodiment. This example lottery ticket 300 includes: (1) a first lottery ticket information or data section 310; (2) a player number section 320; (3) a cash-in value section 330; and (4) a second lottery ticket information or data section 340. In the example embodiment, the first lottery ticket information or data section 310 includes the lottery ticket name, the date and time the lottery ticket was printed, and one or identification symbols or numbers or combinations thereof. In the example embodiment, the player number section 320 includes the players numbers and an indication that the numbers are the player numbers. In this example embodiment, this section also indicates the matched player numbers using the squares. In this example lottery ticket, there are five instances of the number "3"). In the example embodiment, the cash-in value section 330 includes an indication of the cash in now amount which is $10 and an indication of what the player can win if they do not cash in the lottery ticket for the cash in amount. In the example embodiment, the second lottery ticket information or data section 340 includes the amount wagered by the player on the lottery ticket, the date of the drawing, the game, and the lottery ticket identification number and barcode. It should be appreciated that the lottery ticket can be alternatively arranged or configured in accordance with the present disclosure. It should be appreciated that any section of the lottery ticket can be alternatively arranged or configured in accordance with the present disclosure.

It should be appreciated that the cash-in feature described above can be employed with other suitable lottery games in accordance with the present disclosure.

In various embodiments, as further described below, the lottery gaming system and method are configured to be provided by a lottery agency (such as a state lottery agency). In various other embodiments, as further described below, the lottery gaming system and method are configured to be operated by a third party that runs the lottery for a lottery agency (such as a state lottery agency).

In various embodiments of the lottery gaming system, the player may purchase the lottery ticket via any suitable manner. In various embodiments of the lottery gaming system, the lottery ticket is paper. In other embodiments, the lottery ticket is virtual.

Figure 4:
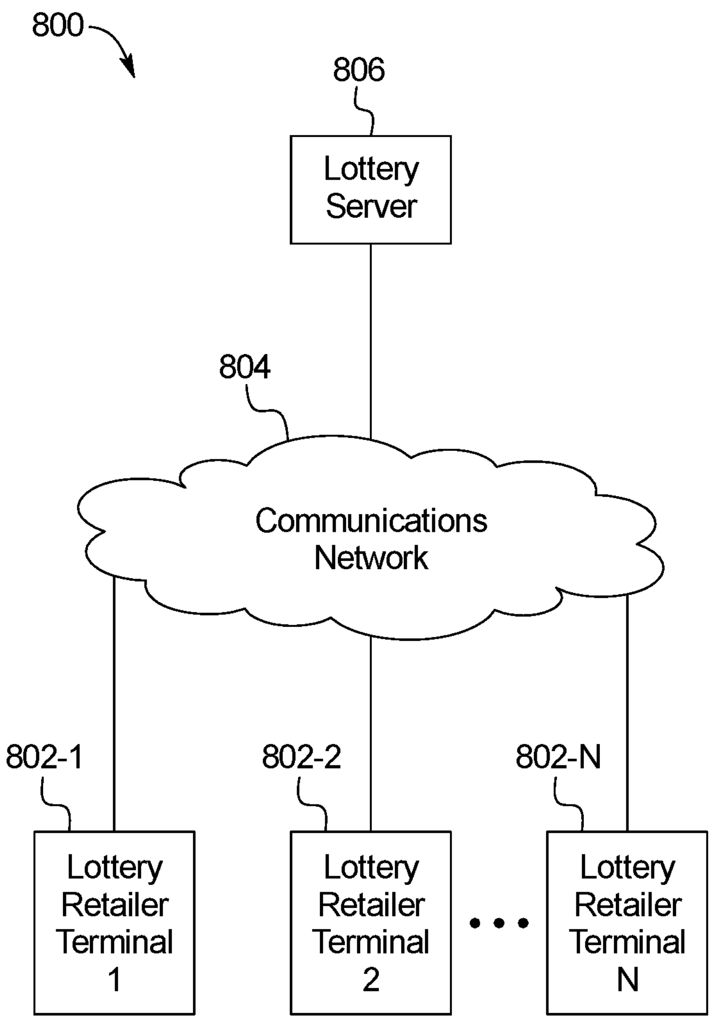
FIG. 4 depicts an example lottery gaming system of one example embodiment of the present disclosure.

In various embodiments of the lottery gaming system, a player may purchase the lottery ticket via any suitable manner such as, but not limited to, one of the following: (1) a dedicated lottery kiosk (e.g., a lottery kiosk) configured to communicate over a data network (such as the Internet) to a lottery server (such as a lottery server 806 described below in connection with FIG. 4); (2) a retailer-operated lottery terminal configured to communicate over a data network (such as the Internet) to a lottery server (such as a lottery server 806 described below in connection with FIG. 4); (3) a personal computer configured to communicate over a data network (such as the Internet) to a lottery server (such as a lottery server 806 described below in connection with FIG. 4); and/or (4) a personal mobile device (such as a cellular telephone, tablet, or PDA) configured to communicate over a data network (such as a wireless or cellular data network) to a lottery server (such as a lottery server 806 described below in connection with FIG. 4).

In one such example, the lottery gaming system enables a player to purchase a lottery ticket at a retail location having a lottery terminal configured to print the lottery ticket at the time of purchase in a conventional manner. In such lottery gaming systems, the retail operator typically receives the purchase price for the lottery ticket from the player in a conventional manner.

In another such example, the lottery gaming system enables a player to purchase a lottery ticket through a retail lottery kiosk, receive the wager from the player, and print the lottery ticket at the time of purchase. This example lottery kiosk may include an integral printer device and/or be in communication with a printer device for providing a printed lottery ticket to the player.

In another such example, the lottery gaming system enables a player to purchase a lottery ticket electronically using a personal mobile device such as the player's mobile telephone. In one such embodiment, the lottery gaming system receives from this device the wager from the player, and sends the player a virtual lottery ticket (which in certain instances can be printed by the player using a suitable personal printing device). Thus, it should be appreciated that in various example embodiments, the player may purchase a lottery ticket with a personal mobile device and, thus, may not be provided with a physical (i.e., paper) lottery ticket. Instead, an electronic (or virtual) version of the lottery ticket is provided to the player via, for example, an electronic mail to an email account associated with the player.

In various example embodiments, for each lottery ticket purchased, the lottery gaming system creates a data record corresponding to that lottery ticket. For example, when a lottery terminal is used to purchase a lottery ticket, the lottery gaming system creates a data record including suitable information such as but not limited to: (1) a timestamp (date and/or time) associated with when the lottery ticket was purchased; (2) the player wager level; (3) the randomly-selected player numbers; (4) the cash-in amount; (5) the lottery ticket identification number; and (6) any other suitable information.

In various example embodiments, this data record is created by the lottery terminal and sent by the lottery terminal to the lottery server (such as described below in connection with the lottery server 806 of FIG. 8). It should be appreciated that the lottery ticket data record can be otherwise suitably created in accordance with the present disclosure.

In this example embodiment, at the designated times for each lottery game or draw, the lottery gaming system randomly selects a winning draw number based on equal odds for selecting that number. The selected winning draw number is applied for any purchased lottery ticket for that specific draw. In other words, this winning draw number can be used for zero, one, or a plurality of different lottery tickets purchased by zero, one, or a plurality of players.

Example Lottery Gaming Systems—General

As mentioned above, in various embodiments, the lottery gaming system and method of the present disclosure are configured to be operated by a lottery agency (such as a state lottery agency).

As mentioned above, in various other embodiments, the lottery gaming system and method of the present disclosure are configured to be operated by a third party that runs the lottery for a lottery agency (such as a state lottery agency).

FIG. 8 illustrates an example networked lottery gaming system 800 for either such implementation. This example network lottery gaming system 800 generally includes: (1) a plurality of lottery retailer terminals 802-1 to 802-N; (2) a communications network 804; and (3) one or more lottery servers such as lottery server 806. Generally, the retailer terminals 802-1 to 802-N and the lottery server 806 are configured to perform the functions described above and further described below.

In this example embodiment, each retailer terminal 802 corresponds to (or is associated with) a particular lottery retailer. For example, the first retailer terminal 802-1 of FIG. 8 may be associated with a first lottery retailer, such as a convenience store, and the second retailer terminal 802-2 of FIG. 8 may be associated with a second lottery retailer, such as a supermarket. It should be understood that any suitable quantity of lottery retailer terminals may be employed in the lottery gaming system 800, along with any suitable quantity of corresponding lottery servers 806.

In various example embodiments, the lottery retailer terminal 802 includes one or more processor(s). Generally, the processor is operative to perform or process instructions, and in particular, to operate in accordance with the various methods described herein. For example, the processor of the lottery retailer terminal 802 may be operable to enable the lottery retailer terminal 802 to transmit data to (and receive data from) the lottery server 806. More specifically, the processor may enable the transmission of data representing each lottery ticket.

In various example embodiments, the lottery retailer terminal 802 includes one or more input device(s). The input devices of the lottery retailer terminal 802 may include components such as an optical scanner and/or a barcode scanner, for reading and/or for deriving information associated with a playslip and/or a lottery ticket. For example, a lottery ticket may include registration marks, authenticity data, various codes, micro-printed indicia, one or more sense marks, and/or other lottery indicia that must be read. Examples of additional input devices include, but are not limited to, a keypad, a mouse, an image capturing device (e.g., an optical character recognition (OCR) device), a biometric reader, a portable storage device (e.g., a memory stick), and the like.

In various example embodiments, the input device(s) of the lottery retailer terminal 802 may include a clock. The clock may be employed to detect, derive and/or append time and/or date information for use by the lottery server 806 to: (i) create a data record corresponding to lottery tickets purchased at the lottery retailer terminal 802, (ii) to determine redemption time, round and/or date information associated with lottery tickets, and/or (iii) determine whether a lottery player has redeemed their lottery ticket in a manner that qualifies the player to receive a particular redemption or settlement amount.

In various example embodiments, the lottery retailer terminal 802 includes one or more output device(s). Such output device(s) may include such components as a display for outputting information to a lottery player or to a terminal operator (e.g., win/loss information and/or payout amounts), one or more benefit output devices (e.g., a cash drawer, a currency dispenser), a printer for producing a physical record (e.g., paper slip, receipt, ticket, voucher, coupon, etc.) that defines a lottery ticket, audio/video output device(s), and the like.

In various example embodiments, the lottery retailer terminal 802 also includes one or more communications port(s), such as a serial port, a modem or the like. Generally, the communications port of the lottery retailer terminal 802 may be operable to facilitate two-way data communications between (i) the lottery retailer terminal 802, and (ii) the lottery server 806. In accordance with some embodiments, the communications port of the lottery retailer terminal 802 may operate to facilitate the transmission of information between the lottery retailer terminal and a player device such as a personal digital assistant (PDA), cell phone and/or a dedicated (e.g., a proprietary) device.

In various example embodiments, the lottery retailer terminal 802 includes a data storage device such as a hard disk, optical or magnetic media, random access memory (RAM) and/or read-only memory (ROM), or the like memory device. Generally, the data storage device of the lottery retailer terminal 802 stores a software program, the software program enabling a processor of the retailer terminal 802 to perform various functions including some or all of the various steps described herein. For example, as noted above with respect to FIGS. 1 to 7, in accordance with certain embodiments, the lottery retailer terminal 802 may be configured to perform some or all of the functions of the lottery server 806 (and vice versa) such that the lottery server 806 and the lottery retailer terminal 802 may be considered as the same "device."

In various example embodiments, a lottery sales device may be utilized in place of a lottery retailer terminal 802. Such a lottery sales device may be implemented as a lottery server, a controller, a dedicated hardware circuit, an appropriately programmed general-purpose computer, or any other equivalent electronic, mechanical or electro-mechanical device. Thus, in various embodiments, a lottery sales device may include, for example, but is not limited to: (1) a video lottery terminal that may include a touch sensitive screen for use by a player; (2) a personal computer (e.g., which communicates with a remote lottery server); or (3) a personal mobile device such as a mobile telephone, a tablet, or a personal digital assistant. The lottery sales device may include any or all of the devices of the aforementioned systems.

In this example embodiment, the lottery server 806 operates to: (1) receive and/or store data associated with one or more lottery tickets including such data as: (a) ticket identifier(s), and (b) ticket indicia; (2) determine at least a first redemption amount associated with a lottery ticket; (3) receive a redemption request associated with the lottery ticket; (4) determine a time of play associated with the redemption request; and (5) transmit an indication of the appropriate redemption amount to a lottery retailer terminal (e.g., for output or display to a lottery player and/or lottery terminal operator).

In various example embodiments, the lottery server 806 includes one or more processor(s). Such a processor functions to process instructions, and in particular, to operate in accordance with various methods described herein. For example, the processor may operate to enable the lottery server 806 to transmit data to (and receive data from) the lottery retailer terminal 802. More specifically, the processor of the lottery server 806 may enable the transmission of data representing a lottery ticket, as well as information defining one or more payout(s) associated with that lottery ticket to or by a specific one of the lottery retailer terminals 802 shown in the lottery network 800 of FIG. 8. Thus, the lottery server 806 may be implemented as a system controller, a dedicated hardware circuit, an appropriately and particularly programmed general-purpose computer, or any other equivalent electronic, mechanical or electro-mechanical device capable of providing for one or more of the embodiments described herein.

In various example embodiments, the lottery server 806 includes one or more input device(s). Examples of such input devices include a keypad, a mouse, a touch-screen, a random number generator, a microphone, and other digital or analog input devices.

In various example embodiments, the lottery server 806 also includes one or more output device(s). Example of output device(s) of the lottery server 806 include a monitor or other display for outputting information to an operator of the lottery server 806 (e.g., for displaying information such as statistical or sales data, win and loss information and/or payout amounts), a printer for producing a physical record (e.g., a report) of such data, and the like. In addition, the lottery server 806 may include one or more communications ports, such as a serial port, modem or the like, operable to facilitate two-way data communications between (i) the lottery server 806 and (ii) one or more lottery retailer terminals 802.

In various example embodiments, the lottery server 806 includes a data storage device (e.g., a hard disk or hard drive, a media-based (removable) memory, or the like). In certain embodiments, the data storage device of the lottery server 806 stores at least one software program, which includes a program to enable the processor of the lottery server 806 to perform some or all of the various steps and functions of at least one implementation of the methods described in detail herein. In addition, the data storage device of the lottery server 806 may operate to store one or more databases including a lottery ticket database and a lottery ticket redemption status database.

In various example embodiments, the lottery server 806 includes a lottery ticket server device that is located at a lottery ticket printing facility, and may also function to manage the ticket printing process. The lottery server 806 may also function to develop a lottery game matrix (e.g., determining base payouts, win frequencies, and the like) and to match static lottery content with secure paytable (or payout distribution) data. In certain embodiments, a lottery ticket printer device for use in such lottery gaming systems may utilize the game matrix information from the lottery server and may apply it to the secure paytable data.

In certain example embodiments, a retailer terminal (such as the first retailer terminal 802-1) of FIG. 8 is configured to perform some or all of the functions of the lottery server 806. Thus, in certain example embodiments, the lottery server 806 and the retailer terminal (such as the first retailer terminal 802-1) (or another given retailer terminal and server pairing) may be considered as the same "device."

Generally, the communications network 804 of FIG. 8 includes one or more local and/or wide-area network(s) proprietary and/or public network(s) (e.g., the Internet) for facilitating two-way data communications between the retailer terminals 802 and the lottery server 806. The lottery server 806 may communicate with lottery retailer terminals 802 directly or indirectly, via a wired or wireless medium, such as via the Internet, via a local area network (LAN), via a wide area network (WAN), via an Ethernet, via a Token Ring, via a telephone line, via a cable line, via a radio channel, via an optical communications line, via a satellite communications link, or via any other appropriate communications system or combinations thereof. Any number and type of devices may be in communication with the lottery server 806, and communication between the lottery retailer terminals 802 and the lottery server 806 may be direct or indirect. A variety of communications protocols may be part of any such communications system, including, but not limited to: Ethernet (or IEEE 802.3), SAP, ATP, Bluetooth™, and TCP/IP.

It should be understood that devices in communication with each other need not be continually transmitting to each other. On the contrary, such devices need only transmit to each other as necessary, and may actually refrain from exchanging data most of the time. For example, a device in communication with another device via the Internet may not transmit data to the other device for days or weeks at a time. In some embodiments, a server may not be necessary and/or preferred. For example, in one or more embodiments, methods described herein may be practiced on a stand-alone gaming device and/or a gaming device in communication only with one or more other gaming devices. In such an embodiment, any functions described as performed by the computer may instead be performed by one or more gaming devices.

As used herein, a lottery retailer may include a merchant who sells lottery tickets at a particular location, authenticates winning lottery tickets, redeems authenticated winning lottery tickets, and/or provides awards to players for winning lottery tickets. Examples of various lottery retailers include, but are not limited to, convenience stores, gas stations, supermarkets, and gaming establishments.

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

The invention claimed is:

1. A lottery gaming system comprising:

a processor; and a memory device that stores a plurality of instructions, that when executed by the processor, cause the processor to:

responsive to receipt of data representing a lottery ticket wager for a play of a lottery game:

randomly select a first quantity of symbols from a plurality of different symbols to determine a player set of symbols for the play of the lottery game, the first quantity being more than one, wherein each of a plurality of the different symbols can be randomly selected more than once to form the player set of symbols, determine any cash-in amount based on the player set of symbols and a paytable for the play of the lottery game, create a lottery ticket comprising an indication of the player set of symbols and an indication of any determined cash-in amount, store data associated with the lottery ticket, and cause the lottery ticket to be provided to the player;

before a draw for the play of the lottery game, responsive to receipt of data representing a cash-in request for the lottery ticket, enable the determined cash-in amount for the lottery ticket to be provided to the player; and after the draw for the play of the lottery game, responsive to the determined cash-in amount for the lottery ticket not being provided to the player, determine any award associated with the lottery ticket.

2. The lottery gaming system of claim 1, wherein any one of the plurality of different symbols can be randomly selected up to an amount equal to the first quantity of symbols.

3. The lottery gaming system of claim 1, wherein the determination of the cash-in amount is based on a quantity of same symbols in the player set of symbols.

4. The lottery gaming system of claim 3, wherein a first quantity of same symbols is associated with a first cash-in amount, and a second higher quantity of same symbols is associated with a second higher cash-in amount.

5. The lottery gaming system of claim 1, wherein the lottery ticket comprises a selected symbols portion and a cash-in amount portion.

6. The lottery gaming system of claim 5, wherein the selected symbols portion of the lottery ticket comprises an indication of each randomly selected symbol of the player set of symbols.

7. The method of claim 1, wherein the lottery ticket is a virtual lottery ticket.

8. The method of claim 1, wherein the lottery ticket is a physical lottery ticket.

9. The lottery gaming system of claim 1, wherein the paytable comprises awards for three or more of the first quantity of symbols being the same as a draw symbol.

10. The lottery gaming system of claim 8, wherein the determination of any cash-in amount for the lottery ticket is based on how many of a same one of the symbols is randomly selected for player set of symbols for the lottery ticket.

11. The lottery gaming system of claim 1, wherein the paytable comprises a plurality of different cash-in amounts and a plurality of different awards, wherein one of the cash-in amounts is greater than one of the awards.

12. A method of operating a gaming system, the method comprising:

responsive to receipt of a data representing a lottery ticket wager for a play of a lottery game made by a player using an input device:

randomly selecting, via a processor, a first quantity of symbols from a plurality of different symbols to determine a player set of symbols for the play of the lottery game, the first quantity being more than one, wherein at least one of the different symbols can be randomly selected more than once to form the player set of symbols, determining, via the processor, any cash-in amount based on the player set of symbols and a paytable for the play of the lottery game, creating the lottery ticket, wherein the lottery ticket comprises an indication of the player set of symbols and an indication of any determined cash-in amount for the lottery ticket, storing data associated with the lottery ticket, and causing the lottery ticket to be provided to the player;

before a draw for the play of the lottery game, responsive to receipt of data representing a cash-in request for the lottery ticket, enabling the determined cash-in amount for the lottery ticket to be provided to the player; and after the draw for the play of the lottery game, responsive to the determined cash-in amount for the lottery ticket not being provided to the player and responsive to a redemption request for the lottery ticket, determining, via the processor, any award associated with the lottery ticket based on the draw.

13. The method of claim 12, which comprises receiving data representing the lottery ticket wager, via a mobile device, for the lottery ticket.

14. The method of claim 12, wherein the lottery ticket is a virtual lottery ticket.

15. The method of claim 12, wherein the lottery ticket is a physical lottery ticket.

16. A method of operating a gaming system, the method comprising:

for a play of a lottery game:

randomly selecting, via a processor, a first quantity of symbols from a plurality of different symbols to determine a player set of symbols for the play of the lottery game, the first quantity being more than one, wherein at least one of the different symbols can be randomly selected more than once to form the player set of symbols, determining, via the processor, any cash-in amount based on the player set of symbols and a paytable for the play of the lottery game, and responsive to receipt of a data representing a lottery ticket wager:

creating the lottery ticket, wherein the lottery ticket comprises an indication of the player set of symbols and an indication of any determined cash-in amount for the lottery ticket, storing data associated with the lottery ticket, and causing the lottery ticket to be provided to the player; and thereafter, for the play of the lottery game:

before a draw for the play of the lottery game, responsive to receipt of data representing a cash-in request for the lottery ticket, enabling the determined cash-in amount for the lottery ticket to be provided to the player, after the draw for the play of the lottery game, responsive to the determined cash-in amount for the lottery ticket not being provided to the player, determining, via the processor, any award associated with the lottery ticket, the determination based on the draw.

17. The method of claim 16, which comprises receiving the data representing lottery ticket wager, via a mobile device, for the lottery ticket.

18. The method of claim 16, wherein the lottery ticket is a virtual lottery ticket.

19. The method of claim 16, wherein the lottery ticket is a physical lottery ticket.

20. The method of claim 16, wherein determining any cash-in amount for the lottery ticket comprises determining how many of a same one of the symbols is randomly selected for the lottery ticket.

* * * * *